Jan. 16, 1968 R. F. LE VASSEUR 3,363,280
FERRULE ASSEMBLY
Filed March 15, 1965
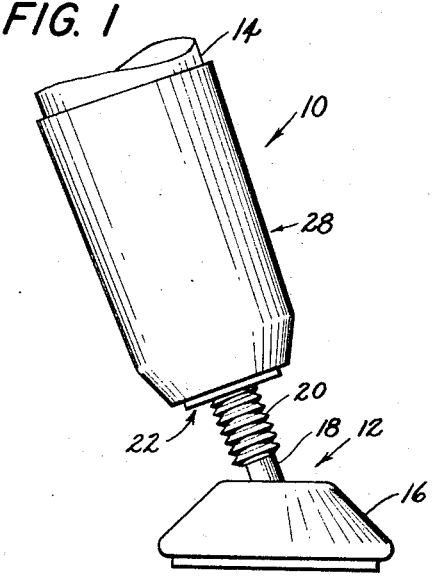
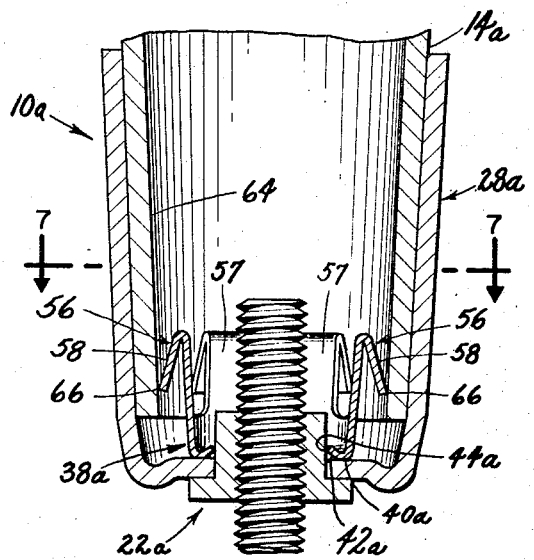
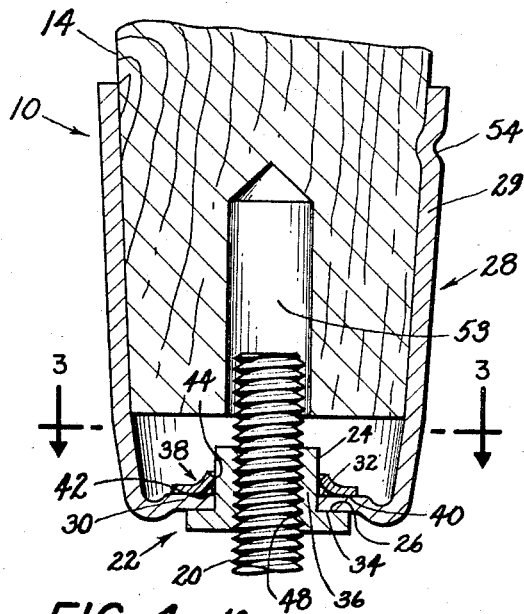
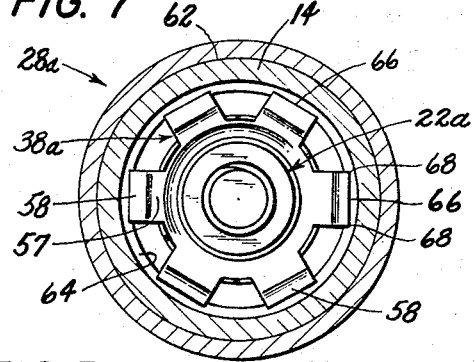
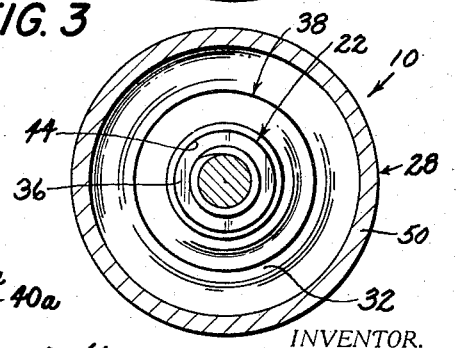
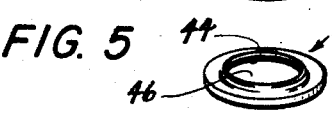
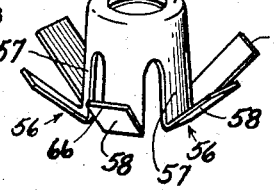
INVENTOR.
Robert F. LeVasseur
BY
McCormick, Paulding & Huber
ATTORNEYS

United States Patent Office 3,363,280
Patented Jan. 16, 1968

3,363,280
FERRULE ASSEMBLY
Robert F. Le Vasseur, Woodbury, Conn., assignor to The Ferrule Manufacturing Corporation, Waterbury, Conn., a corporation of Connecticut
Filed Mar. 15, 1965, Ser. No. 439,623
4 Claims. (Cl. 16—42)

ABSTRACT OF THE DISCLOSURE

In a ferrule assembly for securing an adjustable glide to a furniture leg an annular frusto-conical fastener holds a mounting member which supports the glide in assembly with a ferrule which receives the furniture leg.

---

This invention relates in general to furniture glides, and deals more particularly with improvements in ferrule assemblies for attaching glides to furniture legs or the like.

The general object of the invention is to provide a ferrule assembly for attaching a glide to a furniture leg which is easily manufactured at low cost and which is nevertheless sturdy and rugged and capable of long service life.

Another object of this invention is to provide a ferrule assembly for attaching an adjustable glide to a furniture leg, which ferrule assembly consists of a small number of parts which may be economically manufactured and easily assembled.

A further object of this invention is to provide a ferrule assembly for attaching an adjustable glide to a tubular furniture leg, which ferrule assembly comprises a ferrule, a glide mounting member, and a fastener which performs a dual function in serving as a securing means for maintaining the mounting member in assembly with the ferrule and as a retaining means for maintaining the ferrule assembly in attached position upon the furniture leg.

The drawing shows preferred embodiments of the invention and such embodiments will be described, but it will be understood that various changes may be made from the constructions disclosed, and that the drawing and description are not to be construed as defining or limiting the scope of the invention, the claims forming a part of this specification being relied upon for that purpose.

Of the drawing:

FIG. 1 is an elevational view of a ferrule assembly embodying the present invention, this view showing an adjustable glide in assembly with the ferrule assembly.

FIG. 2 is a fragmentary vertical sectional view on an enlarged scale taken through the ferrule assembly of FIG. 1.

FIG. 3 is a sectional view taken along the line 3—3 of FIG. 2.

FIG. 4 is a perspective view of the mounting member or T-nut used in the ferrule assembly of FIG. 1.

FIG. 5 is a perspective view of the fastener used in the ferrule assembly of FIG. 1.

FIG. 6 is a fragmentary esctional view taken through a ferrule assembly comprising another embodiment of this invention.

FIG. 7 is a sectional view taken along the line 7—7 of FIG. 6.

FIG. 8 is a perspective view of the fastener used in the ferrule assembly of FIG. 6, the fastener being shown inverted relative to its position in FIG. 6 to reveal the contour of the fastener bottom surface.

Turning now to the drawings and first considering FIGS. 1, 2 and 3, a ferrule assembly embodying the present invention is illustrated generally at 10 and is shown in association with an adjustable furniture glide indicated generally at 12. The ferrule assembly 10 is shown attached to a solid cylindrical furniture part 14 which may be taken to be a table leg. The illustrated ferrule assembly is particularly well adapted for use with the furniture glide of my copending patent application entitled Furniture Glide, Ser. No. 375,210, filed June 15, 1964, now abandoned and for the purpose of the present discussion is shown in association with such a glide. Reference may be made to said patent application for a more detailed description and understanding of the glide 12, but for the present it should be noted that it basically comprises a pad or foot 16 and a generally upwardly extending shank 18 having a threaded portion 20, the foot 16 being angularly adjustable relative to the shank 18. The glide 12 is threadably assembled with the ferrule assembly 10 and may be threaded into and out of the assembly to vary the overall length of the leg or other furniture part to which it is attached. It should be understood, however, that at least in its broader aspects the invention is not necessarily limited to a threaded connection between the glide and the ferrule assembly and that other methods of connection may be used if desired.

Considering now the construction of the ferrule assembly 10 in more detail, this assembly is made up of a ferrule 28 adapted for attachment to the leg or part 14, a mounting member 22 for receiving the glide shank 18, and a fastener 38 for holding the mounting member in assembly with the ferrule. The ferrule 28 is a shell, preferably of metal, having a generally cylindrical side wall 29 and a bottom wall 30. In use the ferrule is pressed onto the leg or part 14, and to aid in retaining it on place in the leg or part it preferably includes one or more indentations, such as shown at 54, in its side wall.

The mounting member 22 is fitted in an opening in the bottom wall 30 of the ferrule and includes an upwardly extending generally cylindrical body portion 24 and a lower portion defining an upwardly facing shoulder 26. The body portion 24 passes through and beyond the bottom wall 30 and the shoulder 26 abuts the lower bottom wall surface 34. The fastener 38 surrounds and bites the upwardly protruding part of the body portion 24 and engages the upper bottom wall surface 32 to secure the mounting member in assembly with the ferrule. To allow for threaded connection with the glide the mounting member or nut 22 includes a threaded aperture 48 which receives the threaded portion 20 of the glide shank. An upwardly extending hole 53 is also preferably provided in the leg or part 14 to accommodate the upper portion of the shank 18, if necessary.

The fastener 38 is preferably fabricated from a resilient material in a washer-like form and includes a bottom surface having a flat portion 40 and an upwardly converging frusto-conical portion 42 terminating in a sharp upper edge 44. A generally circular aperture 46 having a diameter before assembly slightly smaller than the diameter of the body portion 24 is defined by the edge 44, as best shown in FIG. 5. The fastener material is preferably resilient and harder than the material of the mounting member 22. Thus, when the fastener is assembled upon the mounting member 22, the edge 44 incises or bites into the body portion 24 along a line of contact between the two members so as to resist movement of the fastener away from the bottom wall 30. Also, the frusto-conical configuration and the resilience of the fastener tend to force the flat portion 40 of the fastener bottom surface downwardly against the upper ferrule surface 32 and also tends to draw the shoulder 26 upwardly against the lower ferrule surface 34, thereby maintaining the mounting member in tight assembly with the ferrule.

FIGS. 6 and 7 show an alternative form of ferrule assembly 10a embodying the invention and adapted for attachment to a tubular furniture leg or the like. This assembly is generally similar to the assembly of FIGS. 1 to 3, inclusive, in the number and arrangement of the parts and in the manner in which the mounting member is secured to the ferrule. The ferrule 28a and the mounting member or nut 22a are substantially identical with the corresponding parts 28 and 22, respectively, of the ferrule assembly 10 and need not be redescribed except for noting that the ferrule 28a includes no indentations similar to the indentation 54 shown in FIG. 2.

The fastener 38a differs, however, in some respects from the corresponding member of the first described form. The bottom portions 40a and 42a and the edge 44a of the fastener 38a are substantially the same as those of the fastener 38, but the fastener 38a further includes a plurality of upwardly extending spring fingers 56, 56. As will be apparent from the description hereinafter, the number and general configuration of the fingers 56, 56 may vary, but preferably and as shown, the fastener 38a includes six circumferentially spaced fingers.

Each of the fingers 56, 56 includes an upwardly and outwardly extending inner portion 57 and an outer portion 58 which extends generally outwardly and downwardly within the ferrule 28a the ferrule being adapted to receive and engage the end portion of a tubular leg 14a with the fastener 38a positioned within the leg as shown best in FIG. 6.

The spring fingers 56, 56 bear outwardly against the interior surface 64 of the leg 14a to retain the ferrule assembly 10a in assembly with the leg. The fingers 56, 56 may take various different shapes, but preferably and as shown, each end portion 58 includes a substantially sharp edge 66, at least a portion of which edge engages the interior surface 64.

In the presently preferred and illustrated form, each edge 66 is substantially straight. In assembly with a leg having a cylindrical inner surface each edge 66 therefore assumes a chordal position relative to the cylindrical surface so as to engage the leg at points of corner contact, as shown at 68, 68 in FIG. 7.

From the foregoing, it will therefore be apparent that the fastener 38a performs a dual function, serving as a securing means for maintaining the mounting nut 22a in assembly with the ferrule 28a and as a retaining means for maintaining the ferrule assembly 10a in attached position upon the leg 14a.

The invention claimed is:

1. A ferrule assembly for attachment to a furniture leg or the like and for use with a glide, said assembly comprising a mounting member for retaining said glide, said mounting member including an upwardly extending generally cylindrical body portion and a lower portion defining an upwardly facing shoulder, a ferrule for receiving a leg such as aforesaid and including a bottom wall having an upper surface and a lower surface, said wall having a generally circular opening through which said body portion passes with said shoulder abutting said wall lower surface, and a fastener made of a material harder than the material of said mounting member for securing said mounting member in assembly with said ferrule, said fastener including a bottom surface having an upwardly converging frustro-conical portion terminating in a sharp upper edge, said edge defining a generally circular aperture having a diameter before assembly slightly smaller than the diameter of said body portion, and said edge surrounding said body portion in gripping engagement therewith with said fastener abutting said wall upper surface.

2. A ferrule assembly adapted for assembly with a tubular furniture part and for use with a glide, said assembly comprising a mounting member for retaining the glide, said mounting member including an upwardly extending generally cylindrical body portion and a lower portion defining an upwardly facing shoulder, a ferrule for receiving a leg such as aforesaid and including a bottom wall having an upper surface and a lower surface, said wall having a generally circular opening through which said body portion passes with said shoulder abutting said wall lower surface, and a resilient fastener for securing said mounting member in assembly with said ferrule, said fastener including a bottom surface having a flat portion and an upwardly converging frustro-conical portion terminating in a sharp edge, said edge defining a generally circular aperture having a diameter before assembly slightly smaller than the diameter of said body portion, said edge surrounding said body portion in gripping engagement therewith with said fastener bottom surface abutting said wall upper surface, said fastener further including a plurality of upwardly extending spring fingers, each of said fingers having an outer end portion, extending generally radially outwardly and downwardly within said ferrule, said spring fingers being so constructed and arranged as to bear outwardly against the interior surface of a tubular furniture part inserted in said ferrule to retain the ferrule assembly in assembly with said furniture part.

3. The combination defined in claim 2 further characterized by each of said end portions terminating in a sharp straight edge.

4. A ferrule assembly adapted for assembly with a tubular furniture part and for use with a glide having a foot and a shank including a threaded portion, said assembly comprising a mounting nut having a threaded aperture which receives the glide shank threaded portion, said mounting nut including an upwardly extending generally cylindrical body portion and a lower portion defining an upwardly facing shoulder, a ferrule for receiving a leg such as aforesaid and including a bottom wall having an upper surface and a lower surface, said wall having a generally circular opening through which said body portion passes with said shoulder abutting said wall lower surface, and a resilient fastener for securing said mounting member in assembly with said ferrule, said fastener including a bottom surface having a flat portion and an upwardly converging frustro-conical portion terminating in a sharp edge, said edge defining a generally circular aperture having a diameter before assembly slightly smaller than the diameter of said body portion, said edge surrounding said body portion in gripping engagement therewith with said fastener bottom surface abutting said wall upper surface, said fastener further including a plurality of circumferentially spaced spring fingers each having an outer end portion extending generally outwardly and downwardly within said ferrule, said spring fingers being so constructed and arranged as to bear outwardly against the interior surface of a tubular furniture part inserted in said ferrule to retain the ferrule assembly in assembly with said furniture part.

References Cited
UNITED STATES PATENTS

| | | | |
|---|---|---|---|
| 419,611 | 1/1890 | McGrath | 85—9 |
| 2,672,659 | 3/1954 | Becker | 151—41.7 |
| 3,000,041 | 9/1961 | Reynolds | 16—42 |
| 3,037,542 | 6/1962 | Boyd | 151—69 |

BOBBY R. GAY, *Primary Examiner.*

D. L. TROUTMAN, *Assistant Examiner.*